(12) United States Patent
Calhoun, Jr.

(10) Patent No.: US 10,976,949 B1
(45) Date of Patent: Apr. 13, 2021

(54) ARCHIVING OF STREAMING DATA

(71) Applicant: Amazon Technologies, Inc., Seattle, WA (US)

(72) Inventor: Robert Mcgregor Calhoun, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 318 days.

(21) Appl. No.: 16/032,013

(22) Filed: Jul. 10, 2018

(51) Int. Cl.
  *G06F 17/00* (2019.01)
  *G06F 7/00* (2006.01)
  *G06F 3/06* (2006.01)
  *G06F 16/11* (2019.01)
  *G06F 16/907* (2019.01)

(52) U.S. Cl.
  CPC ............ *G06F 3/0644* (2013.01); *G06F 3/064* (2013.01); *G06F 3/067* (2013.01); *G06F 3/0617* (2013.01); *G06F 16/113* (2019.01); *G06F 16/907* (2019.01)

(58) Field of Classification Search
  CPC .... G06F 3/0644; G06F 16/907; G06F 16/113; G06F 3/0617; G06F 3/064; G06F 3/067
  USPC ........................................................ 707/769
  See application file for complete search history.

(56) References Cited

U.S. PATENT DOCUMENTS

| | | | | |
|---|---|---|---|---|
| 9,456,243 B1* | 9/2016 | Hughes | ............ | H04N 21/4305 |
| 9,667,720 B1* | 5/2017 | Bent | .................... | H04L 67/1097 |
| 10,229,056 B1* | 3/2019 | Panidis | ................... | G06F 3/065 |
| 10,666,703 B2* | 5/2020 | Paduroiu | ............ | G06F 16/2358 |
| 2009/0133093 A1* | 5/2009 | Hodge | ............... | H04N 21/4325 |
| | | | | 725/137 |
| 2009/0313503 A1* | 12/2009 | Atluri | ................. | G06F 11/1453 |
| | | | | 714/19 |
| 2010/0094803 A1* | 4/2010 | Yamakawa | ........... | G06F 16/907 |
| | | | | 707/609 |
| 2012/0042247 A1* | 2/2012 | Harper | ................ | H04L 65/4076 |
| | | | | 715/716 |
| 2017/0272209 A1* | 9/2017 | Yanovsky | ........... | G06F 12/0253 |
| 2018/0089269 A1* | 3/2018 | Pal | ..................... | G06F 16/24554 |
| 2018/0332095 A1* | 11/2018 | Paduroiu | ............ | H04L 65/4069 |
| 2020/0154165 A1* | 5/2020 | Cohen | ................ | H04N 21/8456 |

* cited by examiner

*Primary Examiner* — Pavan Mamillapalli
(74) *Attorney, Agent, or Firm* — Thorpe North & Western, LLP.

(57) ABSTRACT

Technology is described for a durable and provably complete archival of streaming data for a potentially indefinite retention period. According to the present technology, streaming data may be prepared for storage to meet completeness and consistency requirements that may result in once-and-only-once delivery and serialization of the streaming data. In one example, a storage preparation service may archive a data stream in real-time to a first data store that provides eventual write consistency and use another data store to provide a consistent view of the data. The storage preparation service may capture metadata that satisfies the completeness requirements and may provide conflict resolution to ensure write consistency.

21 Claims, 11 Drawing Sheets

ARCHIVING OF STREAMING DATA

BACKGROUND

Streaming data may include data that is generated continuously by one or more data sources. Typically, the data sources send the data in data records, and in small sizes (order of Kilobytes). Streaming data may include a wide variety of data such as log files generated by customers using mobile or web applications, ecommerce purchases, in-game player activity, information from social networks, financial trading floor data, geospatial services, and telemetry from connected devices or instrumentation in data centers.

Often, the data is processed sequentially and incrementally on a record-by-record basis or over sliding time windows. The data can be used for a wide variety of analytics including correlations, aggregations, filtering, and sampling. Streaming data processing may use two layers: a storage layer and a processing layer. The storage layer may support record ordering and strong consistency to enable fast, inexpensive, and replayable reads and writes of large streams of data.

DETAILED DESCRIPTION

Figure 1:
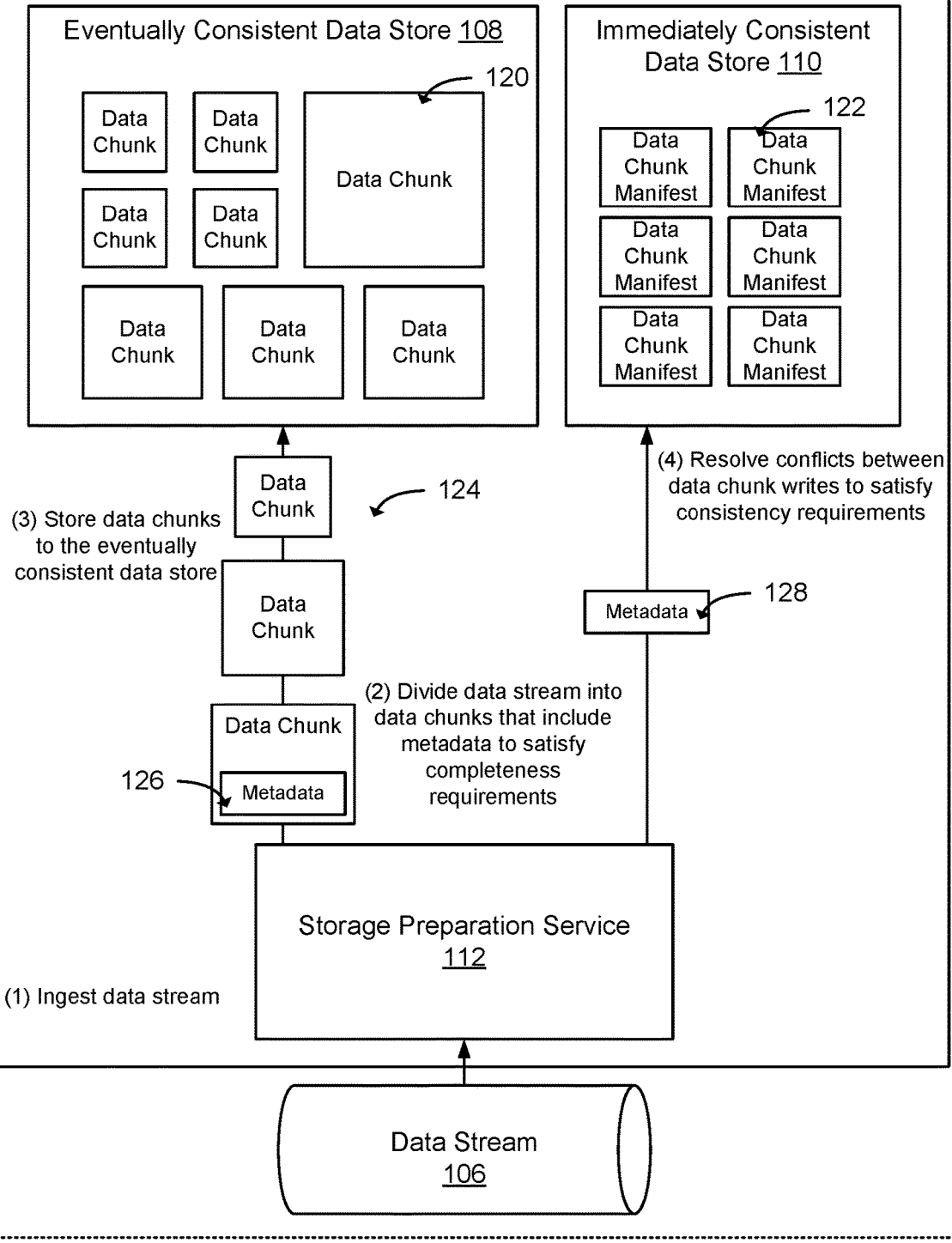
FIG. 1 is a block diagram illustrating an example system for durable and complete archival of streaming data using a stream storage service according to one example of the present technology.

A technology is described for durable and provably complete archival of streaming data for a potentially indefinite retention period using a stream storage service. According to the present technology, streaming data may be prepared for storage to meet completeness and consistency requirements. The stream storage service may provide serialization of the streaming data to a first data store to satisfy the completeness requirements by capturing relationships between data in a data stream as metadata and using the metadata to create links between data chunks in the first data store. The stream storage service may provide once-and-only-once delivery of data to the first data store to satisfy the consistency requirements by utilizing a consistency layer provided by a second data store.

For example, a storage preparation service of a stream storage service according to the present technology may archive a data stream in real-time to a first data store that provides eventual write consistency while using a second data store to provide a consistent view of the data. The storage preparation service may capture or store metadata for the data stream that satisfies the completeness requirements to ensure serializability of the data stream in data chunks of the first data store. The storage preparation service may create manifests for the data chunks of the first data store using a second data store that provides immediate write consistency to provide conflict resolution and to ensure write consistency.

In one example configuration, streaming data may be received at a storage preparation service for ingestion into a stream storage service. The streaming data may be analyzed to identify defining characteristics for the data stream. The defining characteristics for the data may then be used to generate one or more data chunks. For example, the storage preparation service may include specifications for dividing and compressing streaming data into one or more shards, one or more data records, and one or more data chunks. A shard represents a group of data records within the data stream. A shard may be identified by a shard identifier (e.g., a partition identifier or key) and include information about a range of possible sequence numbers for the shard and any whether the shard is related to other shards. A data record represents a unit of data in a shard. Each data record may be identified by a sequence number found within the possible sequence numbers for the shard and include the partition identifier of an associated shard and a data blob. One or more data records in a shard included in the data stream may be captured and form a data chunk to be stored in the stream storage service. A data chunk represents a unit of storage in the stream storage service and may include the data or data blobs from one or more data records and metadata. The metadata may include the partition key of the data records, a start offset, and an end offset. The start offset may represent the sequence number of the first data record having a data blob associated with the data chunk. The end offset may provide a link to a second data chunk. For example, the end offset may represent the sequence number of the last data record having a data blob associated with the data chunk or may directly indicate the start offset of the second data chunk.

A data chunk may be processed for storage to a first data store of the stream storage service. More specifically, the stream storage service may generate the metadata for the data chunk that includes a partition identifier (e.g., a shard identifier associated with a data record included in the data chunk), a start offset (e.g., a sequence number associated with the data record), and an end offset (e.g., the last sequence number of a data record processed in the shard or the next sequence number that is the start offset in another data chunk). The end offset may be used to determine a reference to another data chunk stored in the first data store. Accordingly, in dividing the data stream into multiple data chunks, metadata may be created describing how the data chunks will be stored to the first data store (e.g., the metadata may describe graph edges of a Directed Acyclic Graph (DAG) which link data chunks together for storage purposes). The metadata may be stored with the data chunks in the first data store and may be used to retrieve the data chunks from the first data store and reassemble the data stream from the data chunks.

In the past, streaming data stored to a data store may have been divided into data chunks and stored without guarantees of completeness, correctness, and once-and-only-once delivery. For example, due to the nature of ingesting, buffering, and processing streaming data in real-time, a data stream may have been divided into data chunks and stored using a data store that provides eventual write consistency resulting in a greater number of identical data chunks being stored. The eventual write consistency results in a greater number of conflict incidents of between multiple consumers of the data stream. Consequently, a consistent view of the data written to storage is missing in past systems, thereby increasing a likelihood that resulting data chunks may be identical to data chunks already stored, leading to more incidents of conflict.

According to the present technology, a stream storage service may archive steaming data to an eventually consistent data store which is typically found as a low-cost data storage service for the data records of the data stream. The stream storage service may utilize a metadata capture scheme for proving completeness of the data stream within the data chunks stored in the eventually consistent data store. The metadata may include logical pointers between the data chunks. The stream storage service may also ensure correctness of the storage process in the eventually consistent data store and provide a consistent view of the data utilizing an immediate consistent data store that provides consistent writes. The stream storage service may provide conflict resolution by creating manifests for the data chunks in the immediate consistent data store.

FIG. 1—Service Provider Environment for Data Stream Storage

FIG. 1 is a block diagram illustrating an example system 100 for durable and complete archival of streaming data using a stream storage service according to one example of the present technology. The system 100 may include a computing service environment 102. The computing service environment 102 may include a stream storage service 104 and a data stream 106, both of which may be hosted within the computing service environment 102. The computing service environment 102 may employ virtualization that allows a single physical server computer to host multiple computing instances (e.g., virtual guest machines) using a hypervisor or another virtualization scheme. Each computing instance may be a guest machine acting as a distinct logical computing system. The stream storage service 104 may include an eventually consistent data store 108, an immediately consistent data store 110, and a storage preparation service 112. The stream storage service 104, the eventually consistent data store 108, the immediately consistent data store 110, and the storage preparation service 112 and may be implemented using one or more computing instances included in the computing service environment 102.

The data stream 106 may be generated by one or more producers. A producer may include hardware and/or software elements that put one or more data records into the data stream 106. Some examples of producers may include a web server sending log data, a social network providing a real-time stream of messages or updates, a news site providing recent and trending articles, a weather tracker providing weather data, an application sending changed data events, a sensor network providing sensor data, or a financial monitoring service providing stock data, market orders, and the like. The data stream 106 may include a set of shards. A shard may include a uniquely identified sequence of data records. Each shard may be referenced by a shard identifier, such as a partition key. The partition key may group data from one or more producers within the data stream 106. Therefore, data records belonging to the data stream 106 may be segregated into multiple shards and the partition key associated with each data record used to determine which shard a given data record belongs to. Each data record may include a sequence number that is assigned to the shard within the data stream 106 to which the data records belongs. A data record may be the basic unit of data in the data stream 106. In one example, a data record may include the sequence number (or an offset), a partition key, and a data blob. Each data record may include a sequence number that is unique within its shard.

A producer may continually push data via the data stream 106. The producer may continually push data, via the data stream 106, to one or more consumers, such as the storage preparation service 112 for storage using the eventually consistent data store 108. The storage preparation service 112 may process the data stream 106 to support record ordering and strong consistency to enable fast, inexpensive, and replayable reads and writes of large streams of data. The storage preparation service 112 may be one example of a consumer that processes the data stream 106, for example, in real time.

The eventually consistent data store 108 may include hardware and/or software elements for storing streaming data as data chunks. A data chunk (or data chunk) may be the basic unit of data stored within the eventually consistent data store 108. In one example, the eventually consistent data store 108 may utilize an object storage service that executes within the computing service environment 102. The eventually consistent data store 108 may store data as data chunks 120. A data chunk in the data chunks 120 may include one or more data blobs from data records associated with the data stream 106. The data chunk may be accessed by the eventually consistent data store 108 using one or more references or addresses. For example, the eventually consistent data store 108 may access data chunks using a physical address, a logical address, a content address, and the like. The eventually consistent data store 108 may access data chunks using a key, a name, an identifier, and the like.

The eventually consistent data store 108 may provide an eventually consistent model for data writes. Eventual consistency is a consistency model used in distributed computing to achieve high availability that informally guarantees that, if no new updates are made to a given data item, eventually all accesses to that item will return the last updated value. The system is eventually consistent when queries to the system will all eventually return the same results. "Eventually" means that after an update, the change may not be seen if an immediate read is performed on the data. Without a read-after-write consistency guarantee, a larger inconsistent window may be present, such as under heavy load or when operational issues exist. Thus, the read-after-write consistency guarantee is a weak guarantee and does not usually fulfill stronger constraints found in traditional ACID services (Atomicity, Consistency, Isolation, Durability). Yet, eventual consistency is widely deployed in distributed systems to offer low latency at the risk of returning stale data at a cost typically lower than other storage services providing stronger guarantees.

The immediately consistent data store 110 may include hardware and/or software elements for storing data chunk manifests. A data chunk manifest may be generated using metadata associated with one or more data records of the data stream 106. In one example, the immediately consistent data store 110 may utilize an item-attribute storage service or a key-value storage service that executes within the computing service environment 102 to store data chunk manifests 122. The immediately consistent data store 110 may store data as tables and records. For example, the immediately consistent data store 110 may store the data chunk manifests 122 to include attributes of the data records of the data stream 106, such as a partition identifier, a start offset, an end offset, and the like.

The immediately consistent data store 110 may provide an immediate (or strong) consistent model for data writes. Strong eventual consistency (SEC) adds the safety guarantee that any two reads will be in the same state. This, the immediately consistent data store 110 may provide a consistent view of the data chunks stored in the eventually consistent data store 108 using the data chunk manifests. Strong consistency may be deployed in distributed systems to offer the strong guarantees against the risk of returning stale data at a cost typically higher than other storage services providing weaker guarantees. However, the cost is minimized by storing the smaller data chunk manifests in the immediately consistent data store 110. Additionally, the strong consistency model of the immediately consistent data store 110 provides an immediately consistent "view" of the data chunks stored in the eventually consistent data store 108 as discussed further below.

The storage preparation service 112 may include hardware and/or software elements for preparing data streams for storage using the eventually consistent data store 108 and the immediately consistent data store 110. The storage preparation service 112 may ensure guarantees of completeness, correctness, and once-and-only-once delivery. A guarantee of completeness may mean that data in an input set be included in an output set. A guarantee of correctness may mean that the data be in correct order and format, such as being properly serializable. A guarantee of once-and-only-one delivery may further mean that the current state of the data be immediately known.

In one example, the storage preparation service 112 may process the data stream 106 prior to storing data chunks 124 to the eventually consistent data store 108. The storage preparation service 112 may utilize storage preparation models to archive the data stream 106 that is to be ingested into the eventually consistent data store 108. A storage preparation model may include specifications or definitions for dividing the data stream 106 into data chunks 124. A storage preparation model may also include specifications for compressing specified data chunks 124 using a data compression technique (e.g., run length encoding, Lempel-Ziv, probabilistic models, JPEG/MPEG compression, etc.) prior to storing the data chunks 124 to the eventually consistent data store 108. A storage preparation model may be created for the data stream 106 having certain defining characteristics. Defining characteristics may be characteristics that uniquely identify the data stream 106, such as a format, content, a version, an owner, subdivisions, or other data characteristics.

In one configuration, the storage preparation service 112 may analyze the data stream 106 to identify boundaries between data regions or data records. The storage preparation service 112 may utilize the boundaries to divide the data stream 106 into the data chunks 124. For example, the storage preparation service 112 may analyze the data stream 106 and identify one or more data records using offset values or sequence numbers. Thus, when processing the data stream 106 prior to storing the data stream 106 in the eventually consistent data store 108, the storage preparation service 112 may locate data records in the data stream 106 and locate where the data stream 106 may be divided. The resulting data chunks 124 may be of any size because the storage preparation service 112 may use a variety of boundaries between data regions in dividing the data stream 106 and the density of data records found between the boundaries is not fixed.

The storage preparation service 112 may analyze the data stream 106 to determine whether the data stream 106 may be compressed using a compression technique. For example, data stream 106 may be analyzed to determine whether the size of the data stream 106 is reduced when lossless compression is applied, or whether the size of the data stream 106 is not reduced when lossless compression is applied. Various compression techniques may be tried to identify a compression technique that when applied compresses the data to the smallest size as compared to other compression techniques. In one example, the data stream 106 may first be divided into data chunks 124 based on boundaries between data regions identified in the data stream 106 and various data compression techniques may then be tested using the data chunks 124. As a result, one compression technique may produce better compression results with some data chunks 124 (i.e., data type) as compared to other compression techniques. As an illustration, for the data stream 106 that has been divided into two or more data chunks 124, a first compression technique may be applied to a first data chunk (e.g., a first data type), a second compression technique may be applied to a second data chunk (e.g., a second data type), and no compression may be applied to a third data chunk (e.g., the data may be uncompressible).

As discussed above, the storage preparation service 112 may prepare the data stream 106 to be stored as sequential, logically contiguous chunks, where each chunk is one of the data chunks 124. For each shard in data stream 106, the storage preparation service 112 may determine one authoritative data chunk per shard using a shard identifier (or partition key) and a start offset (e.g., the sequence number of the first data record associated with the data chunk). The storage preparation service 112 may generate a representation of a linked list between data chunks 124 using the metadata 126. For example, the end offset in the metadata 126 of a first data chunk 124 may point to the start offset in the metadata 126 of a second data chunk 124. The storage preparation service 112 may form a linked list of data chunks in this manner with the relationships stored in the metadata 126 of each data chunk. The storage preparation service 112 may provide implementations that differ as to whether the start and/or end offset in the metadata 126 is inclusive regarding the data contained in the data chunk, so long as the end offset in the metadata 126 of one data chunk directly indicates the start offset in the metadata 126 of the next data chunk in the linked list. In this way, the storage preparation service 112 ensures that data readers or clients may make assertions as to whether the data reader has a complete picture of the data stream 106 and up to what point the data reader knows the data is complete.

According to the present technology, in dividing and compressing the data stream 106, the storage preparation service 112 may generate the metadata 126 that enables the data readers to make the above assertions about data completeness. The metadata 126 may describe how the data chunks 124 are stored in the eventually consistent data store 108. The metadata 126 may include information that ensures serializability of the data stream 106. The storage preparation service 112 may generate the metadata 126 to provide a provably complete archival of the data stream 106.

For example, the metadata 126 may describe how a first data chunk 124 is related to a second data chunk 124 as stored in the eventually consistent data store 108. The metadata 126 may form a doubly linked list. Specifically, the metadata 126 may include a start offset and an end offset. The start offset may be used by a data reader to determine whether a data chunk forms the beginning of the linked list. For example, the start offset may include a key word referring to the start of a shard in the data stream 106 (e.g., some partitioning of the data). The start offset may also be used by a data reader to determine whether a data chunk links to another data chunk in the linked list. For example, the end offset in the metadata 126 of a first data chunk 124 may be used to determine the start offset stored in the metadata 126 of a second data chunk 124 in the linked list.

The end offset in the metadata 126 may be used by a reader to determine whether a data chunk forms the end of the linked list. For example, the end offset in the metadata 126 may include a reference to an empty data chunk. The end offset in the metadata 126 may also be used by a reader to determine whether a data chunk links to another data chunk in the linked list. For example, the end offset in the metadata 126 may be used to determine the start offset in the metadata 126 of another data chunk in the linked list.

According to the present technology, a set of deterministic naming rules may be used for each data chunk 124 that is to be stored to the eventually consistent data store 108 as one of the data chunks 120. The name of a first of the data chunks 124 may describe how the first data chunk is related to a second of the data chunks 124 as stored in the eventually consistent data store 108. The name may form part of the doubly linked list. Specifically, the name of the first data chunk may include a reference to a shard and a start offset. A data reader may identify other data chunks by searching for data chunks that include the same shard (e.g., in a name or in metadata), that includes an end offset related to the start offset, and the like. Inversely, a data reader may identify other data chunks by searching for data chunks that include the same shard (e.g., in a name or in metadata) and that include a start offset related to the end offset found in the metadata of the data chunk.

Accordingly, the storage preparation service 112 may allow for tight integration with existing streaming applications to offload streaming event data to a durable storage with an indefinite retention period. The storage preparation service 112 provides lower processing overhead to generate the metadata to preserve serializability and provide strong guarantees of completeness as discussed further below. In this way, data readers of the data chunks 124 may make assertions as to whether a complete picture of the data stream 106 exists. The metadata preserves information about the data stream 106 readily enabling the data readers to determine up to what point the data is complete in the eventually consistent data store 108.

As shown in FIG. 1, the metadata 126 may be stored in the data chunks 124 in the eventually consistent data store 108. Alternatively, the metadata 126 may be stored in a different location from the data chunks 124. The metadata may be used to verify the archive of the data stream 106 using the data chunks 124 retrieved from the eventually consistent data store 108. The metadata 126 may also be utilized to determine how to decompress and reassemble the data stream 106 using the data chunks 124 retrieved from the eventually consistent data store 108. In one example, an authoritative data chunk that includes the metadata 126 may be created and stored as one of the data chunks 124 in the eventually consistent data store 108. The metadata in the authoritative data chunk may reference the data chunks 124 stored in the eventually consistent data store 108, thereby allowing for retrieval of the data chunks from the eventually consistent data store 108 using the metadata.

In one example, a Directed Acyclic Graph (DAG) may be generated representing the data stream 106 stored in the eventually consistent data store 108, where the DAG describes graph edges for the DAG. The DAG may be included in the metadata 126 stored with the data chunks 124 in the eventually consistent data store 108. Illustratively, an authoritative data chunk may contain a keyword for a start offset and an end offset that may be used as a reference in a linked list to the next of the data chunks 124 stored in the eventually consistent data store 108. The end offset may be used to retrieve the next of the data chunks 124 from the eventually consistent data store 108 and the data stream 106 may be verified and/or reconstructed.

According to the present technology, the storage preparation service 112 may provide strong guarantees of completeness using the metadata 128 and the immediately consistent data store 110. The metadata 128 may include all or part of the metadata 126. The metadata may further include relationships between data chunks, shards, and data streams. The storage preparation service 112 may create the data chunk manifests 122 and utilize the strong write consistency of the immediately consistent data store 110 to provide a consistent view of the data chunks 124 stored in the eventually consistent data store 108. In order to ensure convergence, the storage preparation service 112 may reconcile the differences between multiple copies of the data chunks 124 that may be stored in the eventually consistent data store 108 (i.e., conflicts may be flagged). The storage preparation service 112 may choose the appropriate final state when concurrent updates have occurred by layering the immediate write consistency of the immediately consistent data store 110 with the eventual consistency of the eventually consistent data store 108. The correction of any conflict takes place during a write operation of the data chunk manifests 122. If an inconsistency has been found, the individual write operation may be stopped or ignored, preserving the consistency of prior writes that occurred in data chunk manifests 122 of the immediately consistent data store 110 and thus in the data chunks 120 of the eventually consistent data store 108.

Figure 2:
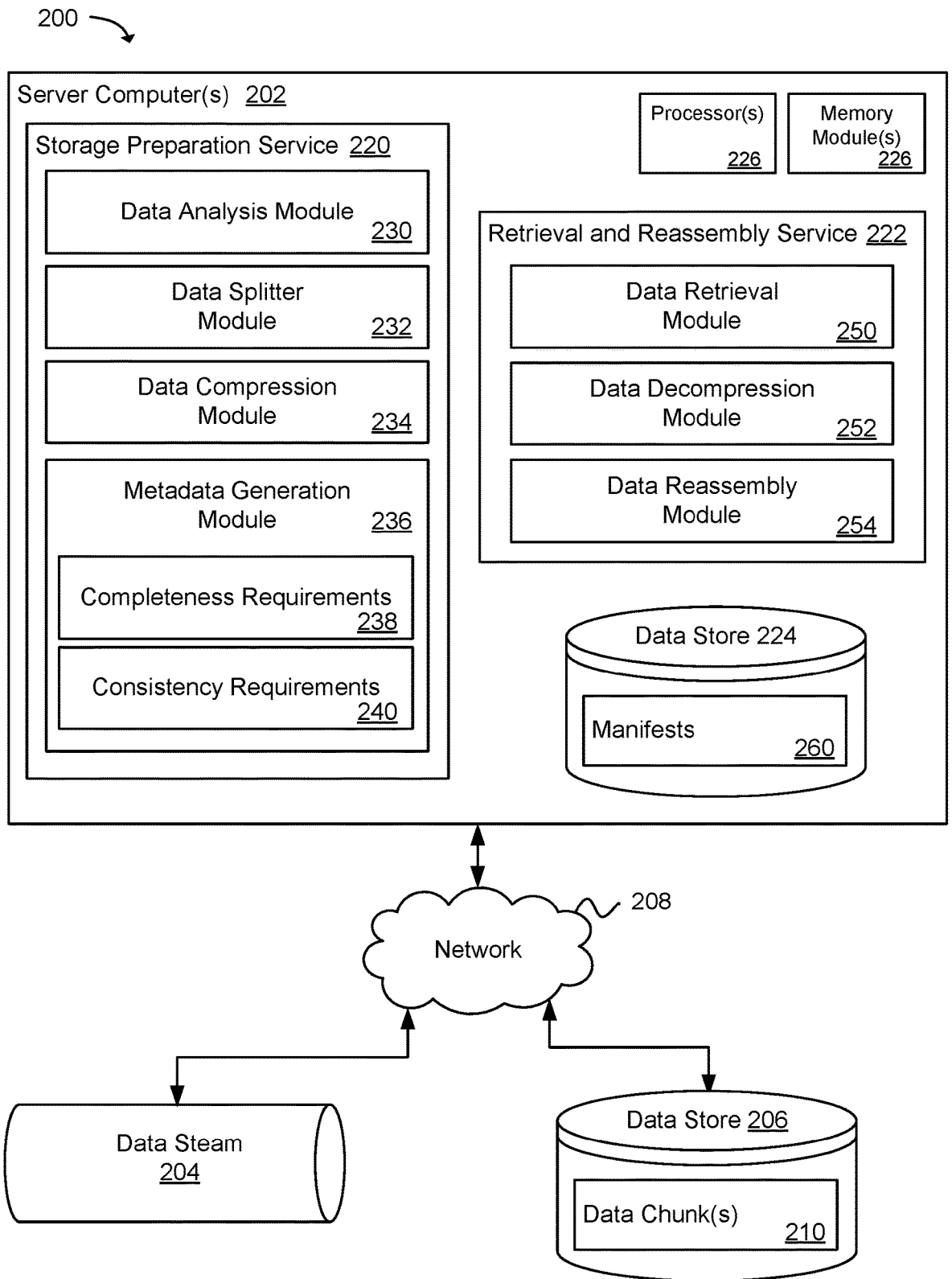
FIG. 2 is a block diagram that illustrates various example components included in a system for processing streaming data to be stored to a stream storage system according to one example of the present technology.

FIG. 2—Storage and Retrieval System

FIG. 2 is a block diagram that illustrates various example components included in a system 200 for processing streaming data to be stored to a stream storage service according to one example of the present technology. The system 200 may include one or more server computer(s) 202 that may receive a data stream 204 and be in communication with a data store 206 via a network 208. The server computer(s) 202 may contain one or more services used in storing and/or retrieving the data stream 204 from the data store 206 as data chunk(s) 210. In one example, the services provided by the server computer(s) 202 may include a storage preparation service 220, a retrieval and reassembly service 222, and a data store 224.

The storage preparation service 220 may be configured to process the data stream 204 for storage to the data store 206. The storage preparation service 220 may include a data analysis module 230, a data splitter module 232, a data compression module 234, and a metadata generation module 236. The metadata generation module 236 may include one or more completeness requirements 238 and one or more consistency requirements 240.

The data analysis module 230 may be configured to analyze the data stream 204 that is to be stored to the data store 206. The data analysis module 230 may identify defining characteristics for the data stream 204. For example, the data stream 204 received at the storage preparation service 220 may be analyzed to identify defining characteristics for the data stream 204, such as a type, format, version, name, owner, or any other characteristic that may be used to prepare the data stream 204 for storage. Using one or more of the defining characteristics, the storage preparation service 220 may process the data stream 204 using the data splitter module 232 and the data compression module 234.

The data splitter module 232 may be configured to divide the data stream 204 according to one or more specifications. For example, the data stream 204 may be parsed to identify boundaries between data regions, data chunks, or data records in the data stream 204. The data stream 204 may be divided at each point where a data boundary may be identified, potentially resulting in multiple data chunks. The data compression module 234 may be configured to identify data chunks that are to be compressed (e.g., data chunks having a data type or particular characteristic) and compress the data chunks using a specified compression technique.

The metadata generation module 236 may be configured to generate metadata that satisfies the completeness requirements 238 and the consistency requirements 240. The completeness requirements 238 may include a set of rules or policies that indicate the level of completeness at which data is to be stored. The completeness requirements 238 may dictate the manner at which completeness is to be ensured. For example, the completeness requirements 238 may include a rule requiring that the data be 100% complete. This level of completeness may cause multiple copies of the data to be stored, introducing a need for conflict resolution. Hence, the consistency requirements 240 may include a set of rules or policies that indicate the strength of a consistency guarantee for a data write and how conflicts are to be resolved. For example, the consistency requirements 240 may include a rule requiring a strong guarantee of write consistency in order that the most current view of the data be consistent. Thus, any write conflict may need to be resolved quickly.

According to the present technology, the metadata generation module 236 may generate metadata that preserves completeness (e.g., serializability) of the data stream 204 in order to satisfy the completeness requirements 238. The metadata may describe a linked list indicating how to retrieve data chunks from the data store 206 and reassemble the data stream 204 using the data chunks. For example, the metadata may identify, directly or indirectly, data chunks associated with data stream 204 stored in the data store 206, and provide information that may be used to retrieve, decompress, and reassemble the data stream 204 using the data chunks. In another example, the metadata may include a name for a data chunk that includes a shard identifier, a start offset, and an identifier associated with a consumer of the data stream 204 that prepared the data chunk for storage. The metadata may also include a start offset and an end offset that may be used to retrieve the data chunks from the data store 206.

In another example, the metadata may include a portion of a hash ring that may be used to identify other data chunks stored in the data store 206 that form part of the same ring. When creating a data stream, a hash function may be used to map associated data records to shards using the hash key ranges of the shards. A shard's hash ring may be used to generate the metadata that preserves serializability of the data stream 204 in order to satisfy the completeness requirements 238. A data reader can verify the completeness of the data stream as stored by collecting and verifying the parts of the shard's hash ring stored in the metadata.

In generating the metadata, a DAG that represents the data stream 204 stored in the data store 206 may be created and may be included in the metadata. Relationships between multiple shards or partitions may also be included in the metadata. The metadata, in one example, may be included in a root data chunk that may be stored in the data store 206 with related data chunks. In another example, the metadata may be included in individual data chunks, such that the metadata in a first data chunk may point to a second data chunk. In storing the data chunks to the data store 206, a reference, key, or hash value for the root data chunk may be returned to a system or customer that requested the storage of the data stream 204.

In another example, the metadata generation module 236 may generate metadata that provides a consistent view of the storage of the data chunks from data stream 204 in order to satisfy the consistency requirements 240. The metadata generation module 236 may create a manifest for each data chunk utilizing the data store 224 that includes immediate write consistency features in order to satisfy the consistency requirements 240 and provide conflict resolution. The existence of a manifest for a data chunk in the data store 224 may immediately inform a data reader that the data chunk is present in the eventually consistent data store 108.

The retrieval and reassembly service 222 may be configured to retrieve data chunks from the data store 206. The retrieval and reassembly service 222 may reassemble the data stream 204 (or a representation thereof) using the data chunks in response to a request for the data stream 204. In one example, the retrieval and reassembly service 222 may include a data retrieval module 250, a data decompression module 252, and a data reassembly module 254. The data retrieval module 250 may be configured to retrieve data chunks from the data store 206. For example, a shard identifier and a start offset that references a root data chunk stored in the data store 206 may be provided to the data retrieval module 250 by a customer or service and a request may be submitted to the data store 206, which may retrieve the root data chunk and return the root data chunk to the retrieval and reassembly service 222.

In one example, metadata included in the root data chunk may include a shard identifier, a start offset, and an end offset. The end offset may be used to reference the remaining data chunks stored in the data store 206 that comprise the data stream 204. For example, the data retrieval module 250 may utilize the shard identifier and the end offset in the metadata of one data chunk to determine a name for the next potential data chunk stored in the data store 206. The retrieval and reassembly service 222 may be configured to retrieve the remaining data chunks from the data store 206 by submitting requests to the data store 206, wherein the data store 206 then returns the data chunks to the retrieval and reassembly service 222.

The data decompression module 252 may be configured to decompress data chunks that were compressed when stored to the data store 206. Metadata retrieved from a root data chunk, or metadata retrieved from individual data chunks, may identify data chunks that have been compressed and may identify a compression technique that may be used to decompress the data chunks. The metadata may be provided to the data decompression module 252, which may be configured to identify the compressed data chunks and decompress the data chunks using a decompression technique identified in the metadata.

The data reassembly module 254 may be configured to reassemble data stream 204 using the data chunks retrieved from the data store 206. The data stream 204 may be reassembled using the data chunks according to a structure or order described in the metadata. In one example, the metadata may be provided to the data reassembly module 254, which may be configured to identify individual data chunks retrieved from the data store 206 and reassemble the data stream 204 according to instructions included in the metadata. As an illustration, a data chunk containing a data record header, a data chunk containing a data record body, and a data chunk containing a data record footer may be identified and a data record may be reassembled using the data chunks according to an order described in the metadata. Having reassembled data stream 204, the retrieval and reassembly service 222 may be configured to return the data stream 204 (or a representation thereof) to a system or customer that requested the data stream 204.

According to the present technology, the storage preparation service 220 may use the data store 224 to ensure write consistency of the data chunks to the data store 206. In one example, the data store 224 may be configured to simulate semaphores or "locking" on the processing of data stream 204 for storage in the data store 206. Data store 206 may provide eventual write consistency; however, there is no guarantee that the current "view" of the data is correct.

The data store 224 may include one or more manifests 260. The storage preparation service 220 may store a manifest in the data store 224 to ensure a consistent view of the data stored in the data store 206. Additionally, the storage preparation service 220 may store a manifest in the data store 224 to indicate one or more relationships between shards or partitions of the data stored in the data store 206. The manifests 260 may be written to by an archiving consumer or client of the storage preparation service 220 to satisfy write consistency requirements for the data store 206. The retrieval and reassembly service 222 may use the data store 224 to provide unambiguous access to authoritative data chunks. The manifests 260 may be read by a reassembly consumer or client of the retrieval and reassembly service 222 to access and verify the completeness of an archive of the data stream 204.

In one example, the data store 224 may include one or more access patterns. For example, a "Put Manifest" access pattern may be called with a shard identifier and a start offset by an archiving consumer of the storage preparation service 220 processing the data stream 204. The data store 224 may store values for a shard or partition identifier (hash key), a start offset (sort key), an end offset, a worker identifier, an approximate interval start, and an approximate interval end. The data store 224 may require the "Put Manifest" access pattern be idempotent upon the shard identifier and a start offset. This restricts the archiving consumer of the storage preparation service 220 from changing a record owned by another archiving consumer of the storage preparation service 220 while also allowing updates that have not been written to the manifests 260. As a result, the data store 224 may provide a more consistent view of the data stored in data store 206 than the eventual consistency of the data store 206 itself.

In another example, a "Get Manifest" access pattern may be called with a shard identifier and a start offset by a reassembly consumer of the retrieval and reassembly service 222 to access the authoritative data chunk of the identified shard with the specified start offset. A "Get Manifests" access pattern may be called with a shard identifier by a reassembly consumer of the retrieval and reassembly service 222 to access all authoritative data chunks of the identified shard.

In yet another example, a "Create Partition" access pattern may be called with a shard identifier by an archiving consumer of the storage preparation service 220 processing the data stream 204 to store relationships between shards. The data store 224 may store values for a shard or partition identifier (hash key), a set of Parents, and a set of children to represent the relationships between shards. An "Add Child to Parent" access pattern may be called with parent and child shard identifiers by an archiving consumer of the storage preparation service 220 processing the data stream 204 to store relationships between the shards. According to one example of the present technology, a "root" partition may be created that provides a sentinel partition. The root partition may allow a reassembly consumer of the retrieval and reassembly service 222 to start at the root of the archive and navigate the entire tree of relationships between partitions and their referenced data chunks.

The various processes and/or other functionality contained within the system 200 may be executed on one or more processors 226 that are in communication with one or more memory modules 228. The system 200 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store 224 may include storage systems such as a SAN (Storage Area Network), cloud storage network, volatile or non-volatile RAM, optical media, or hard-drive type media. The data store 224 may be representative of a plurality of data stores as can be appreciated.

The network 208 may include any useful computing network, including an intranet, the Internet, a local area network, a wide area network, a wireless data network, or any other such network or combination thereof. Components utilized for such a system may depend at least in part upon the type of network and/or environment selected.

Communication over the network may be enabled by wired or wireless connections and combinations thereof.

Figure 3:
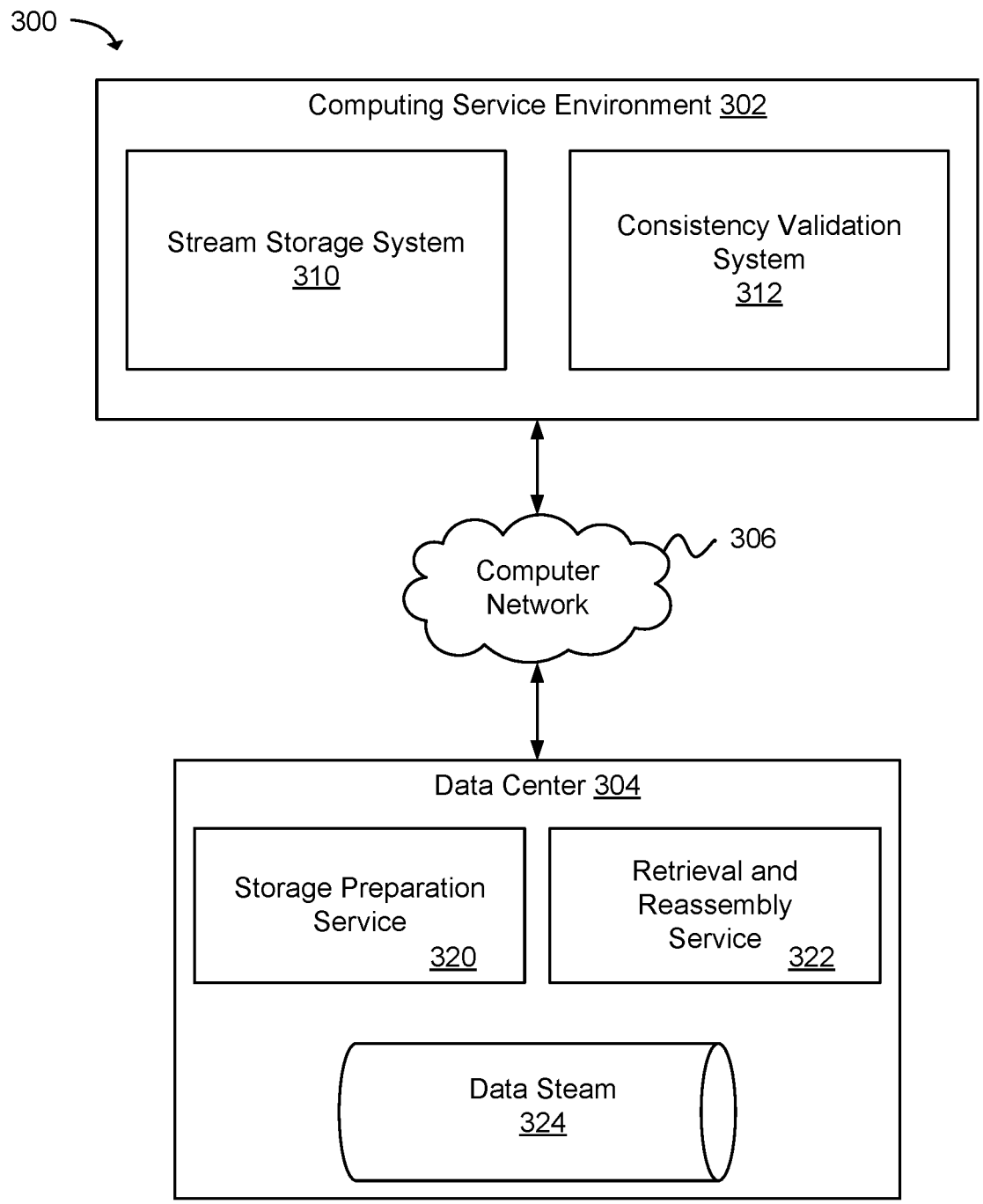
FIG. 3 is a block diagram that illustrates a system for preparing data streams at a customer data center for storage in a stream storage system that may be hosted in a computing service environment according to one example of the present technology.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting FIG. 3—Distributed Storage and Retrieval System FIG. 3 is a block diagram that illustrates a system 300 for preparing data streams at a customer data center for storage in a stream storage service that may be hosted in a computing service environment according to one example of the present technology. The system 300 may include a computing service environment 302, a data center 304, and a computer network 306.

In one example, the computing service environment 302 may be operated by a computing service provider that offers computing services. The computing service environment 302 may include a stream storage service 310 and a consistency validation service 312. Stream storage service 310 may include a lower cost data store that provides eventual write consistency. Consistency validation service 312 may include a data store that provides immediate write consistency.

As illustrated, the data center 304 may host a storage preparation service 320 and a retrieval and reassembly service 322 for a data stream 324. The storage preparation service 320 may be configured to process the data stream 324 that is to be stored to the stream storage service 310. After dividing the data stream 324 into data chunks, a root data chunk containing metadata describing how to retrieve the data stream 324 may be generated, thereby enabling retrieval of the data stream 324 from the stream storage service 310.

The data stream 324 (i.e., data chunks) may be transmitted over a computer network 306 to the stream storage service 310 located in the computing service environment 302. In the event that the data stream 324 is to be retrieved from the stream storage service 310, the retrieval and reassembly service 322 may be configured to submit a hash value (or a key) for a root data chunk to the stream storage service 310, whereupon the root data chunk may be returned to the retrieval and reassembly service 322. Metadata included in the root data chunk may then be used to identify and retrieve the remaining data chunks from the stream storage service 310 and to reassemble the data stream 324 using the data chunks.

Figure 4A:
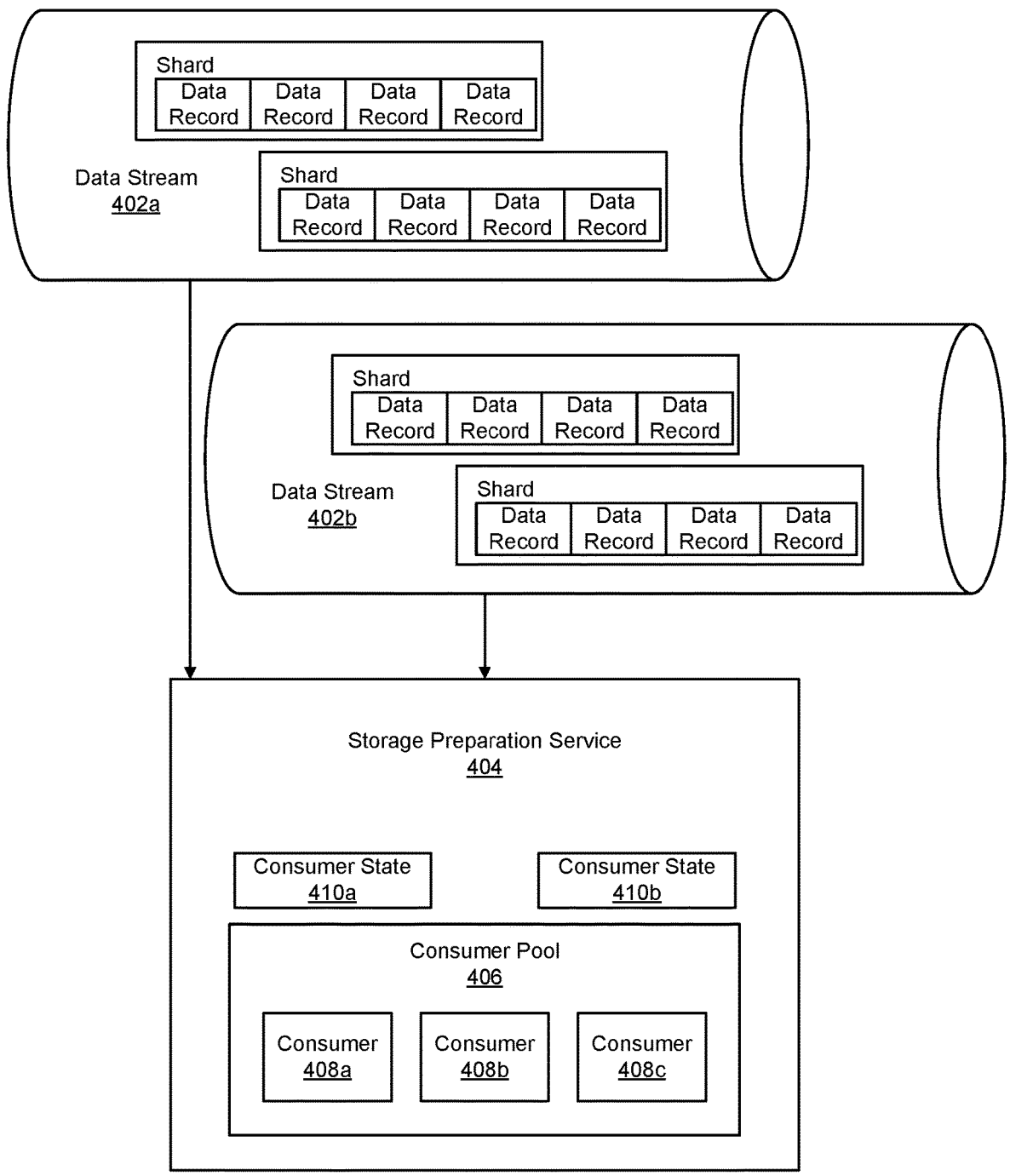
FIGS. 4A and 4B are diagrams that illustrate an example method for preparing a data stream for storage to a stream storage system and resulting data structures according to one example of the present technology.
Figure 4B:
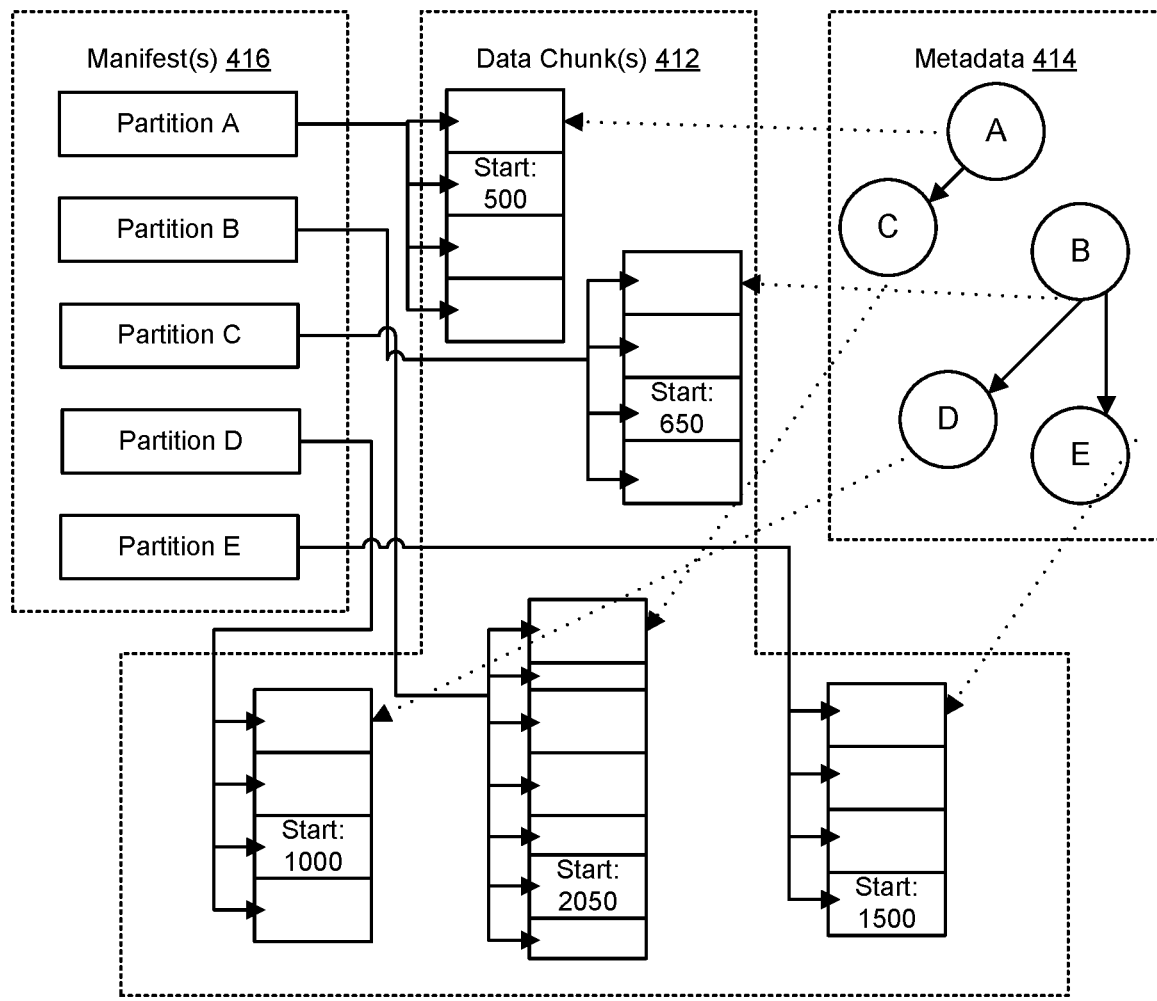

FIGS. 4A and 4B—Data, Metadata, and Manifests

FIGS. 4A and 4B are diagrams that illustrate an example method for preparing a data stream for storage to a stream storage service and resulting data structures according to one example of the present technology. As illustrated in FIG. 4A, a data stream 402a and a data stream 402b may include one or more shards. Each shard may be identified by a shard identifier. Each shard may include one or more data records. A data record may be identified by a sequence number that is unique within the containing shard.

A storage preparation service 404 may process the data streams 402a, 402b to divide the data streams 402a, 402b into one or multiple data chunks. The storage preparation service 404 may include a consumer pool 406 having one or more consumers, such as consumers 408a, 408b, and 408c. The storage preparation service 404 maintain state information for processing the data streams 402a, 402b, for example, as consumer state 410a and consumer state 410b. For example, the storage preparation service 404 may assign the consumer 408a as a worker to an iterator using the consumer state 410a to begin processing data records associated with the data stream 402a. The iterator may indicate to the consumer 408a where in the data stream 402a to begin or continue processing. Illustratively, the data streams 402a, 402b may be processed iteratively to identify data records included in the data streams 402a, 402b available for consumption. The consumer 408a may collect a predetermined number of data records or await collection for a predetermined amount of time. The consumer 408a of the storage preparation service 404 may then prepare the data records as data chunks for storage and create metadata that preserves serializability and ensures write consistency.

In order to satisfy requirements of completeness and consistency, the storage preparation service may create data chunk(s) 412, metadata 414, and manifest(s) 416 as illustrated in FIG. 4B. To ensure write consistency, in one example, the storage preparation service 404 may create one or more manifest(s) 416. A manifest may describe a single data chunk or a set of data chunks associated with a partition. A partition may correspond directly to a shard in the data streams 402a, 402b. In another example, a partition may include more than one shard or a portion of a shard. The manifest may include a partition identifier, a start offset, an end offset, a worker identifier (e.g., an identifier associated with the worker that collected the data records from the data streams 402a, 402b), an approximate interval start, and an approximate interval end.

The storage preparation service 404 may utilize the manifest(s) 416 to provide conflict resolution. Specifically, a first worker may create a set of data chunks having a start offset of 500 and an end offset of 550, for example. A write of the set of data chunks by the first worker to the stream storage service may be eventually consistent, however, a second worker may create another set of data chunks having the same start offset of 500 and a different end offset of 650. It is possible that a write of the other set of data chunks by the second worker may overwrite or be overwritten. The manifest(s) 416 may be used to ensure that any conflicts are resolved. When creating a data chunk, a worker may use a deterministic set of rules to name the data chunk. The data chunk may be named using the shard identifier, start offset, and worker identifier. Thus, two data chunks having the same shard identifier and start offset would have different names based on the worker identifier that processed the data chunks. A worker would not be able to create or overwrite the manifest for a data chunk having the same shard identifier and start offset but with a different worker identifier.

In order to ensure serializability, in one example, the storage preparation service 404 may preserve relationships between the data chunk(s) 412 using metadata 414. The metadata 414 may include references or pointers between data chunks that form a doubly linked list. A worker may traverse the linked list to verify that the data is complete and where data may be missing. The metadata 414 may also include relationships between partitions (or shards) that each include a set of data chunks. The metadata 414 may describe graph edges of a Directed Acyclic Graph (DAG) which link multiple partitions and multiple data chunks together.

Figure 5:
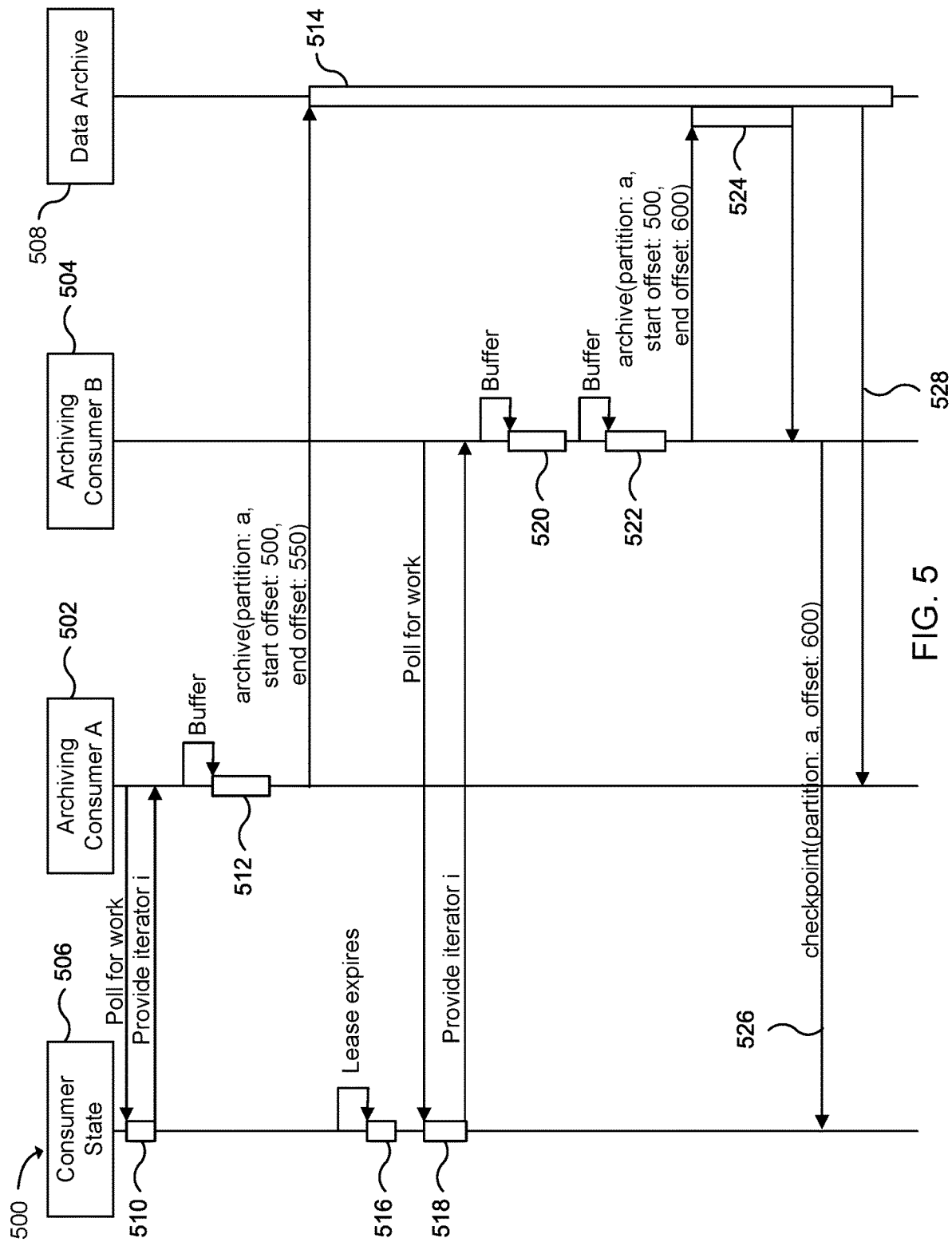
FIG. 5 is a sequence diagram that illustrates an example sequence for preparing data for storage to a stream storage system to ensure serializability according to one example of the present technology.

FIG. 5—Data Stream Archival Serializability Requirements

FIG. 5 is a sequence diagram that illustrates an example sequence 500 for preparing data for storage to a stream storage service to ensure serializability according to one example of the present technology. In this example, archiving consumer A 502 and an archiving consumer B 504 may poll a consumer state 506 associated with streaming data to store the data stream in a data archive 508. In operation 510, the archiving consumer A 502 may poll the consumer state 506 for work. The consumer state 506 may provide a data record iterator (e.g., iterator i) that enables the archiving consumer A 502 to iterate over one or more shards and one or more data records in a shard. In another operation 512, the archiving consumer A 502 buffers one or more data records over which the archiving consumer A 502 iterates using the iterator obtained from the consumer state 506.

In operation 514, the archiving consumer A 502 makes a storage call to the data archive 508 to store the data records. The archiving consumer A 502 may archive the data records according to a partition identifier, a start offset, and an end offset. For example, the archiving consumer A 502 may collect data records from start offset 500 to end offset 550. The archiving consumer A 502 may implement a scheme where the start and/or end offset is included in the data records stored in a data chunk so long as the end of the one chunk of data in a data chunk directly indicates the start of the next.

While the archiving consumer A 502 awaits eventual write consistency with the data archive 508, in operation 516, a lease on the data records associated with the iterator may expire. In operation 518, the archiving consumer B 504 may poll the consumer state 506 for work. The consumer state 506 may provide a data record iterator (e.g., iterator i) that enables the archiving consumer B 504 to iterate over one or more shards and one or more data records in a shard already collected by the archiving consumer A 502. In operations 520 and 522, the archiving consumer B 504 buffers one or more data records over which the archiving consumer B 504 iterates using the iterator obtained from the consumer state 506.

In operation 524, the archiving consumer B 504 makes a storage call to the data archive 508 to store the data records. The archiving consumer B 504 may archive the data records according to a partition identifier, a start offset, and an end offset. For example, the archiving consumer B 504 may collect data records from start offset 500 to end offset 600. The archiving consumer B 504 may receive confirmation of write consistency with the data archive 508 prior to completion of operation 514. In operation 526, the archiving consumer B 504 may make a checkpoint call to the consumer state 506 in order to indicate that the data records associated with the iterator have been successfully stored.

In operation 528, the archiving consumer A 502 may finally receive confirmation of write consistency with the data archive 508. This scenario may introduce conflicts in the storage of the data stream. Consequently, the archiving consumer A 502 and the archiving consumer B 504 may capture relationship information about the data records and generate metadata that resolves such conflicts and ensures serializability. For example, the archiving consumers 502, 504 may implement a deterministic naming pattern for data chunks. Specifically, the archiving consumers 502, 504 may create a name for a data chunk that includes a partition identifier, a start offset, and a worker identifier. Thus, a data chunk named from partition A and start offset 500 that includes up to end offset 550 will create a name conflict with another data chunk named from partition A and start offset 500 that includes up to end offset 600 because of the added worker identifiers.

Additionally, the partition identifier, start offset, end offset, and worker identifier may be stored as metadata in the data chunks. The start offsets and end offsets may be used as "links" in a doubly linked lists of the data chunks that captures the serializability of the data stream. The partition identifier and the start offset can be used to determine the name of another data chunk where the start offset points to the end offset in the metadata of the other data chunk. The partition identifier and the end offset can be used to determine the name of another data chunk where the end offset points to the start offset in the name or metadata of the other data chunk. A consumer may retrieve the metadata and traverse the linked list by generating the names of data chunks for retrieval from the metadata of the current data chunk. If duplicate data chunks are found that include the same start offset and end offset, the data chunks are equivalent and one can be selected for processing. If duplicate data chunks are found that include the same start offset but different end offsets, each can be checked to determine how the linked list continues.

Figure 6:
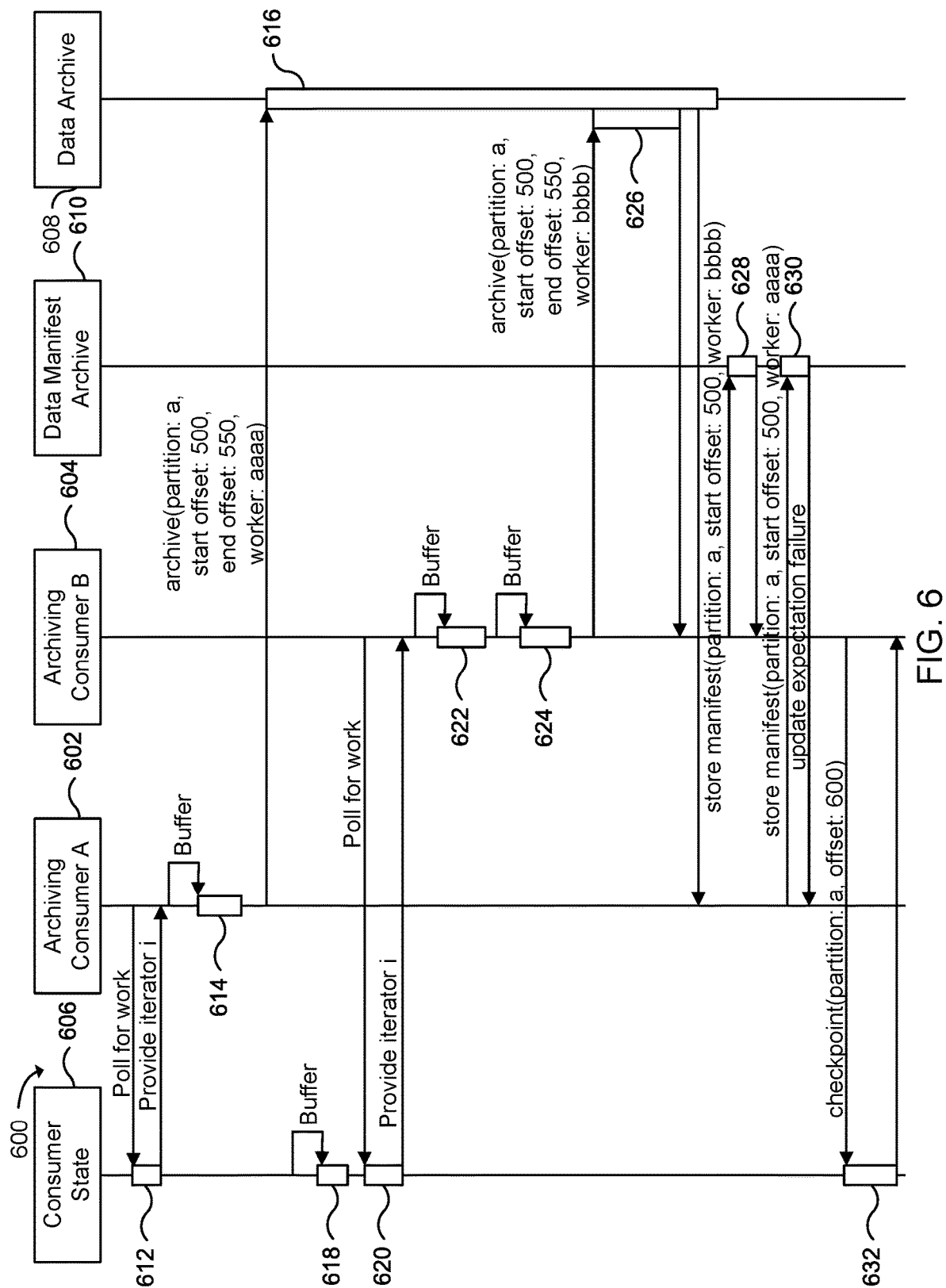
FIG. 6 is a sequence diagram that illustrates an example sequence for preparing data for storage to a stream storage system to ensure consistency according to one example of the present technology.

FIG. 6—Data Stream Archival Consistency Requirements

FIG. 6 is a sequence diagram that illustrates an example sequence for preparing data for storage to a stream storage service to ensure consistency according to one example of the present technology. In this example, an archiving consumer A 602 and an archiving consumer B 604 may poll a consumer state 606 associated with streaming data to store the data stream in a data archive 608. A data manifest 610 is included to provide conflict resolution and provide immediate write consistency.

In operation 612, the archiving consumer A 602 may poll the consumer state 606 for work. The consumer state 606 may provide a data record iterator (e.g., iterator i) that enables the archiving consumer A 602 to iterate over one or more shards and one or more data records in a shard. In operation 614, the archiving consumer A 602 buffers one or more data records over which the archiving consumer A 602 iterates using the iterator obtained from the consumer state 606.

In operation 616, the archiving consumer A 602 makes a storage call to the data archive 608 to store the data records. The archiving consumer A 602 may archive the data records according to a partition identifier, a start offset, an end offset, and a worker identifier. For example, the archiving consumer A 602 may collect data records from start offset 500 to end offset 550. The archiving consumer A 602 may implement a scheme where the start and/or end offset is inclusive regarding the data records stored in a data chunk so long as the end of the one chunk of data in a data chunk directly indicates the start of the next.

While the archiving consumer A 602 awaits eventual write consistency with the data archive 608, in operation 618, a lease on the data records associated with the iterator may expire. In operation 620, the archiving consumer B 604 may poll the consumer state 606 for work. The consumer state 606 may provide a data record iterator (e.g., iterator i) that enables the archiving consumer B 604 to iterate over one or more shards and one or more data records in a shard already collected by the archiving consumer A 602. In operations 622 and 624, the archiving consumer B 604 buffers one or more data records over which the archiving consumer B 604 iterates using the iterator obtained from the consumer state 606.

In operation 626, the archiving consumer B 604 makes a storage call to the data archive 608 to store the data records. The archiving consumer B 604 may archive the data records according to a partition identifier, a start offset, an end offset, and a worker identifier. For example, the archiving consumer B 604 may collect data records from start offset 500 to end offset 600. The archiving consumer B 604 may receive confirmation of write consistency with the data archive 608 prior to completion of operation 616.

In operation 628, the archiving consumer 604 may make a create manifest call to the data manifest 610. The archiving consumer 604 may create a data manifest according to a partition identifier, a start offset, an end offset, and a worker identifier. The create manifest call may be idempotent the partition identifier and a start offset allowing only one unique tuple to be created by any one worker.

In operation 630, the archiving consumer A 602 may finally receive confirmation of write consistency with the data archive 608. The data manifest 610 helps resolve conflicts that may occur in the storage of the data stream. Consequently, the archiving consumer A 602 is notified through a failure that another worker (e.g., the archiving consumer 604) has already created a manifest for the same data chunks and may be immediately provided with a consistent view of the data being stored.

In operation 632, the archiving consumer 604 may make a checkpoint call to the consumer state 606 in order to indicate that the data records associated with the iterator have been successfully stored. Consequently, the archiving consumer 604 may checkpoint on behalf of the archiving consumer A 602, which is now free to return poll for additional work from the consumer state 606.

The eventual consistency of the data archive 608 may incur the generation of duplicate data chunks. Since the metadata stored in each data chunk may provide a complete view of the data stream, a garbage collection process may read the metadata to remove any duplicates without affecting the overall completeness and serializability of the data stream. In one example, the notification through a failure message that another worker (e.g., the archiving consumer 604) has already created a manifest for the same data chunks may allow the archiving consume to mark particular duplicate data chunks for garbage collection.

Figure 7:
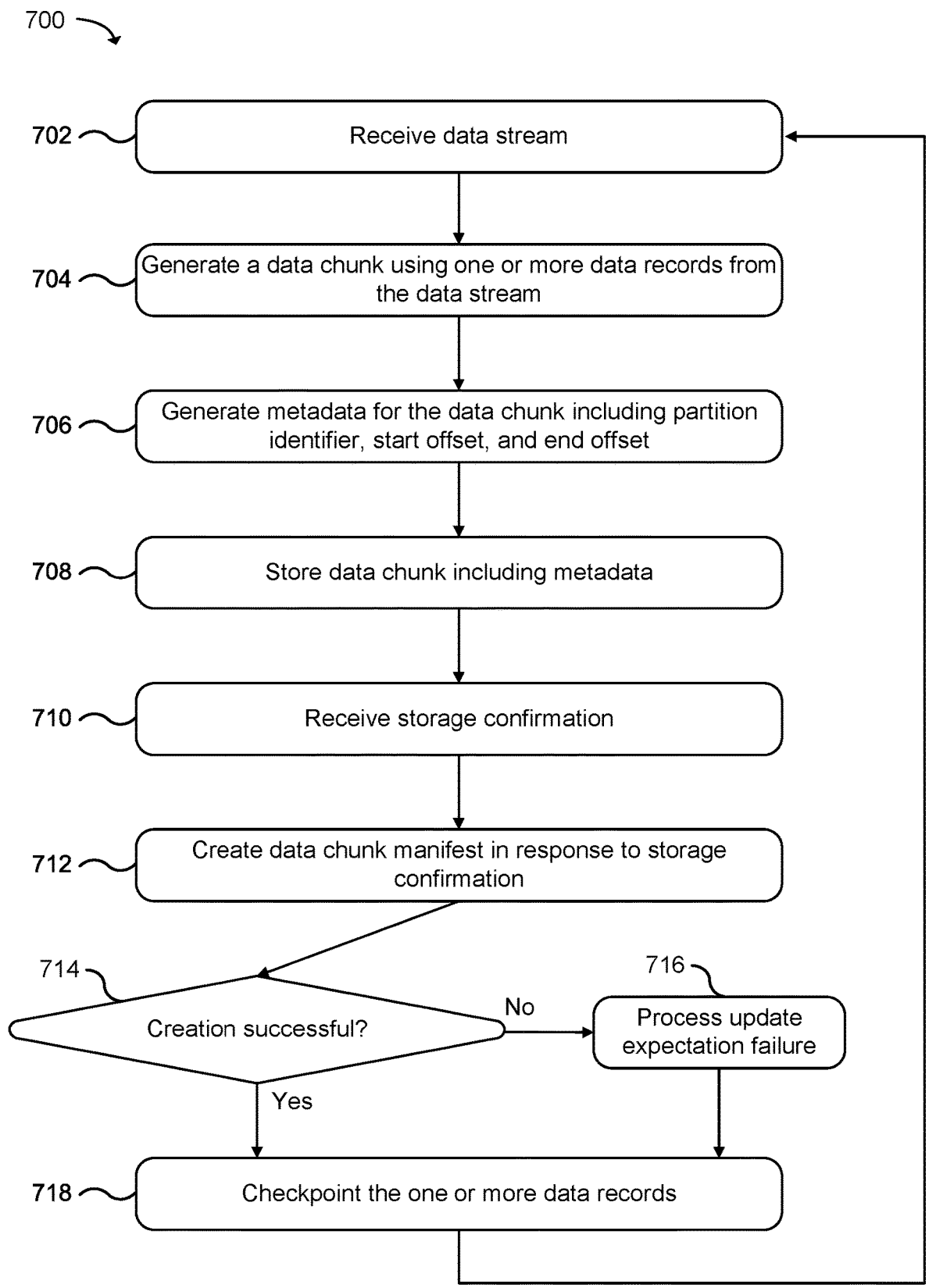
FIG. 7 is a flow diagram that illustrates an example method for preparing data streams for storage to a stream storage system to satisfy completeness and correctness requirements according to one example of the present technology.
Figure 8:
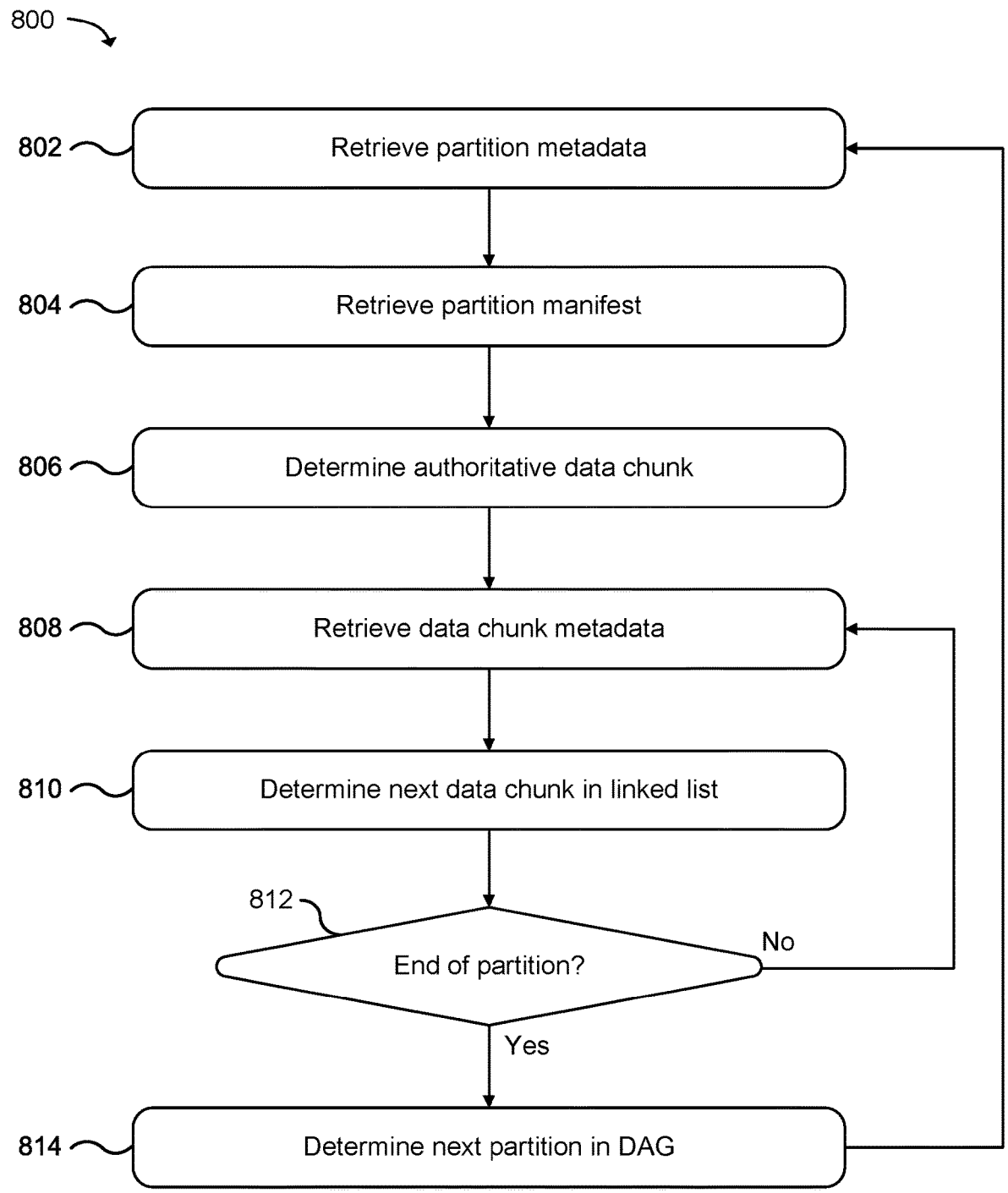
FIG. 8 is a flow diagram that illustrates an example method for retrieving data streams from storage in a stream storage system according to one example of the present technology.

FIGS. 7 and 8—Data Stream Storage and Retrieval

FIG. 7 is a flow diagram that illustrates an example method 700 for preparing data streams for storage to a stream storage service to satisfy completeness and correctness requirements according to one example of the present technology. The method 700 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 700 enables the offloading of streaming event data to a durable storage with an indefinite retention period.

In operation 702, a storage preparation service may receive a data stream. For example, the storage preparation service may ingest the data stream using an ingestion pipeline. The ingestion may be continuous or asynchronous, real-time or batched or any combination of these options. The storage preparation service may use some type of transformation or conversion for the data records in the data stream prior to storage. In operation 704, the storage preparation service may generate a data chunk using one or more data records from the data stream. The storage preparation service may generate a data chunk from one data record or from multiple data records.

In operation 706, the storage preparation service may generate metadata for the data chunk that includes a partition identifier, a start offset, and an end offset. The metadata may include a deterministic name for the data chunk, such as a name that includes a reference to a partition identifier, a start offset, and a worker identifier that processed the data chunk. In operation 708, the storage preparation service may store the data chunk including the metadata. The storage preparation service may store the data chunk in an eventually consistent data store. The storage preparation service may generate a storage key for the data chunk using the name that includes the partition identifier, the start offset, and the worker identifier.

In operation 710, the storage preparation service may receive a confirmation of storage of the data chunk. The confirmation of storage of the date chunk may include the storage key having the name for the data chunk that includes the partition identifier, the start offset, and the worker identifier. In operation 712, the storage preparation service may create a data chunk manifest in response to the storage confirmation. For example, the storage preparation service may create the data chunk manifest in an immediately consistent data store. The data chunk manifest may include the partition identifier, the start offset, the end offset, and a worker identifier. If creation of the data chunk manifest is determined to be unsuccessful in operation 714, the storage preparation service may process any update expectation failures in operation 714. In operation 714, the storage preparation service may receive update expectation failures when trying to create a data chunk manifest. An update expectation failure may occur when a worker attempts to create the data chunk manifest for a given partition identifier and start offset associated with the data chunk. The updated expectation failure may result when another worker has created the data chunk manifest for the given partition identifier and start offset.

The storage preparation service may make the assertion that the data chunk is present and stored in the eventually consistent data store because of the presence of the data chunk manifest in the immediately consistent data store. However, the storage preparation service may attempt to checkpoint the one or more data records to release the data records from further processing in operation 716. For example, assuming that the other worker failed subsequent to creating the data chunk manifest and prior to checkpointing the one or more data records, the storage preparation service may attempt to checkpoint the one or more data records in operation 716 and then continue to receive the data stream and process data records in operation 702.

If creation of the data chunk manifest is determined to be successful in operation 714, the storage preparation service may checkpoint the one or more data records in operation 716. The storage preparation service may then continue to receive the data stream and process data records in operation 702. Accordingly, the storage preparation service may capture metadata that satisfies completeness requirements and may provide conflict resolution through the data chunk manifests to ensure write consistency.

FIG. 8 is a flow diagram that illustrates an example method 800 for retrieving data streams from storage in a stream storage service according to one example of the present technology. The method 800 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 800 enables the retrieval and reconstruction of streaming event data from a durable storage.

In operation 802, a retrieval and reassembly service may retrieve partition metadata. The partition metadata may include information about a partition that includes one or more data chunks. The partition metadata may include a partition identifier and parent/child information associated with the partition. In operation 804, the retrieval and reassembly service may retrieve a partition manifest. The partition manifest may identify an authoritative data chunk that represents the first data chunk in a doubly-linked list of data chunks stored in the stream storage service.

In operation 806, the retrieval and reassembly service may determine the authoritative data chunk using the partition manifest. The retrieval and reassembly service may retrieve the authoritative data chunk and any accompanying metadata from storage in operation 808. In operation 810, the retrieval and reassembly service may determine the next data chunk in the list using the metadata. The retrieval and reassembly service may generate a search for the name of the next data chunk, and name that includes the partition identifier and the end offset in the metadata. The retrieval and reassembly service may also generate a search for metadata in the next data chunk, metadata that includes the same partition identifier and a start offset derived from the end offset.

If the next data chunk does not indicate the end of the partition in operation 812, the retrieval and reassembly service may retrieve the next data chunk and any accompanying metadata from storage in operation 808 and continue the process. If the end of the partition is determined in operation 812, the retrieval and reassembly service may determine the next partition in the DAG using the partition metadata. The method 800 may then continue in operation 802 my retrieving the partition metadata for the next partition.

Figure 9:
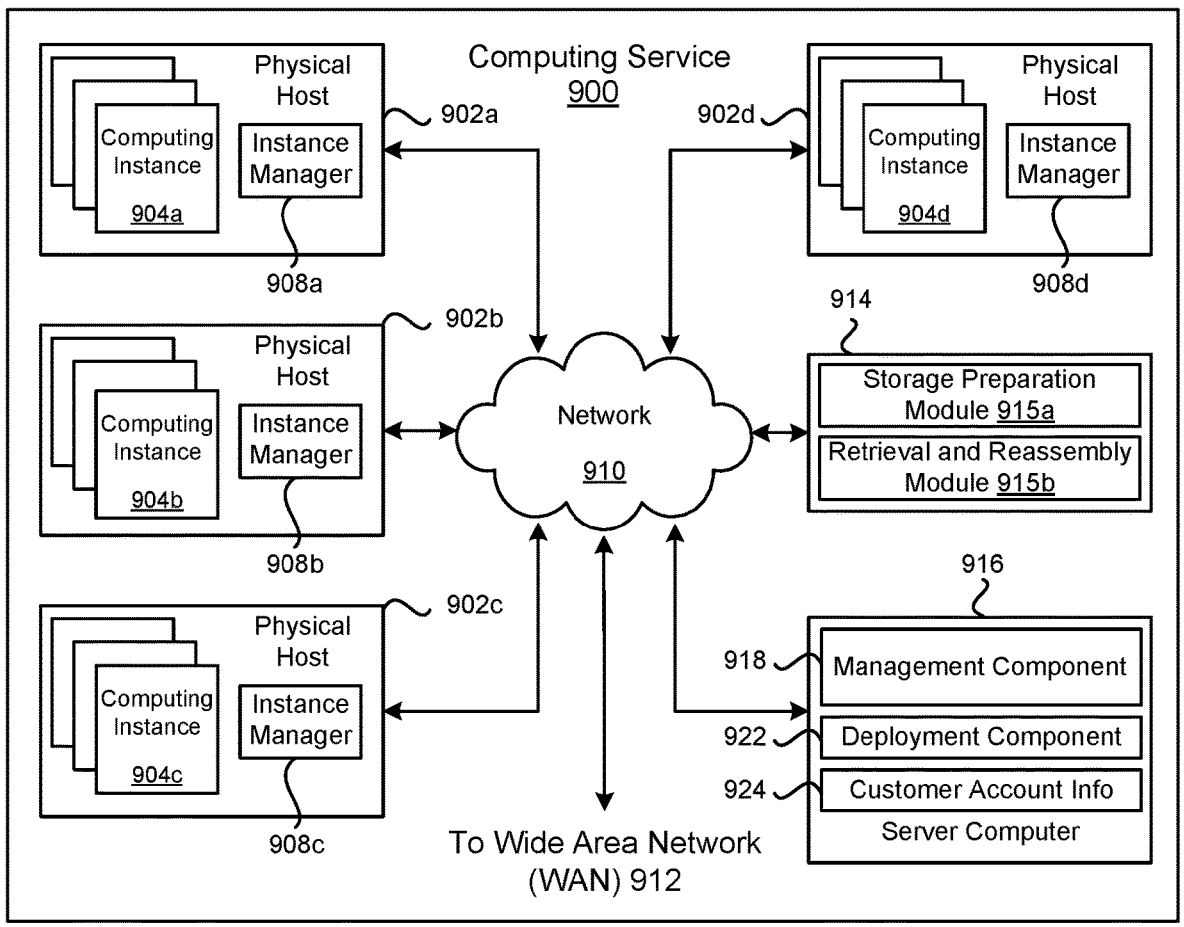
FIG. 9 is a block diagram that illustrates an example computing service that includes a storage preparation service and a retrieval and reassembly service according to one example of the present technology.

FIG. 9—Example Computing Service

FIG. 9 is a block diagram that illustrates an example computing service that includes a storage preparation service, and a retrieval and reassembly service according to one example of the present technology. The computing service 900 may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904a-d.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS"), Platform as a Service ("PaaS"), and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine manager (VMM), or another type of program configured to enable the execution of multiple computing instances 904a-d on a single server. Additionally, each of the computing instances 904a-d may be configured to execute one or more applications.

A server computer 914 may be reserved to execute software components for implementing the present technology or managing the operation of the computing service 900 and the computing instances 904a-d. For example, the server computer 914 may execute a storage preparation module 915a operable to perform a durable and provably complete archive of streaming event data and a retrieval and reassembly module 915b operable to reassemble the data stream from the archive after an indefinite period of time.

A server computer 916 may execute a management component 918. A customer may access the management component 918 to configure various aspects of the operation of the computing instances 904a-d purchased by a customer. For example, the customer may setup computing instances 904a-d and make changes to the configuration of the computing instances 904a-d.

A deployment component 922 may be used to assist customers in the deployment of computing instances 904a-d. The deployment component 922 may have access to account information associated with the computing instances 904a-d, such as the name of an owner of the account, credit card information, country of the owner, etc. The deployment component 922 may receive a configuration from a customer that includes data describing how computing instances 904a-d may be configured. For example, the configuration may include an operating system, provide one or more applications to be installed in computing instances 904a-d, provide scripts and/or other types of code to be executed for configuring computing instances 904a-d, provide cache logic specifying how an application cache is to be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902a-d, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the server computers 902a-d. The network topology illustrated in FIG. 9 has been simplified, as many more networks and networking devices may be utilized to interconnect the various computing systems disclosed herein.

Figure 10:
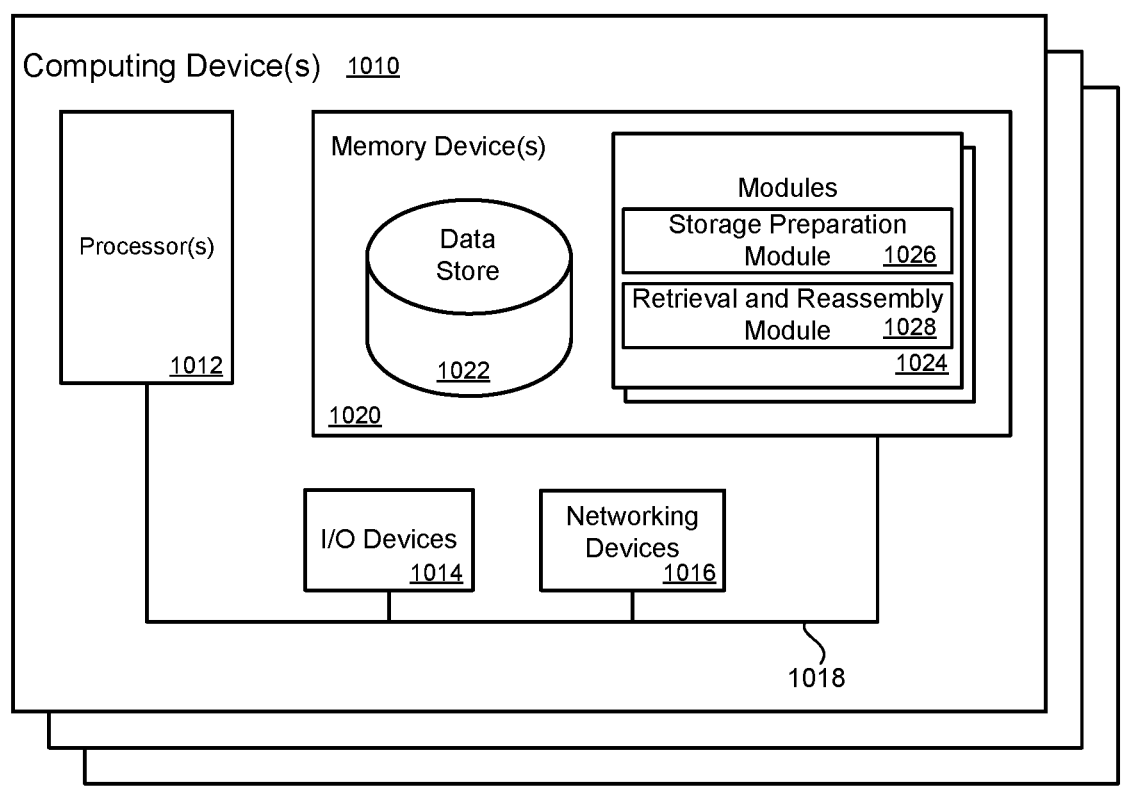
FIG. 10 illustrates one or more computing device(s) on which modules or code components of this technology may execute.

FIG. 10—Example Computing Device

FIG. 10 illustrates one or more computing device(s) 1010 on which modules or code components of this technology may execute. A first computing device 1010 is illustrated on which a high-level example of the technology may be executed. The first computing device 1010 may include one or more processor(s) 1012 that are in communication with memory device(s) 1020. The computing device may include a local communication interface 1018 for the components in the computing device. For example, the local communication interface may be a local data bus and/or any related address or control busses as may be desired.

The memory device(s) 1020 may contain modules 1024 or code components that are executable by the processor(s) 1012 and data for the modules 1024. The modules 1024 may execute the functions described earlier. In this example, the memory device(s) 1020 include a storage preparation module 1026 operable to perform a durable and provably complete archive of streaming event data and a retrieval and reassembly module 1028 operable to reassemble the data stream from the archive after an indefinite period of time.

A data store 1022 may also be located in the memory device(s) 1020 for storing data related to the modules 1024 and other applications along with an operating system that is executable by the processor(s) 1012. Other applications may also be stored in the memory device(s) 1020 and may be executable by the processor(s) 1012. Components or modules discussed in this description that may be implemented in the form of software using high programming level languages that are compiled, interpreted, or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. The networking devices 1016 and similar communication devices may be included in the computing device. The networking devices 1016 may be wired or wireless networking devices that connect to the internet, a LAN, WAN, or other computing network.

The components or modules that are shown as being stored in the memory device(s) 1020 may be executed by the processor(s) 1012. The term "executable" may mean a program file that is in a form that may be executed by a processor(s) 1012. For example, a program in a higher-level language may be compiled into machine code in a format that may be loaded into a random-access portion of the memory device(s) 1020 and executed by the processor(s) 1012, or source code may be loaded by another executable program and interpreted to generate instructions in a random access portion of the memory to be executed by a processor. The executable program may be stored in any portion or component of the memory device(s) 1020. For example, the memory device(s) 1020 may be random access memory (RAM), read only memory (ROM), flash memory, a solid-state drive, memory card, a hard drive, optical disk, floppy disk, magnetic tape, or any other memory components.

The processor(s) 1012 may represent multiple processors and the memory 1020 may represent multiple memory units that operate in parallel to the processing circuits. This may provide parallel processing channels for the processes and data in the system. The local communication interface 1018 may be used as a network to facilitate communication between any of the multiple processors and multiple memories. The local communication interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for archiving streaming data in data stores having an eventually consistent storage model, comprising:
   receiving, at a stream storage service having a plurality of archiving consumers that prepare streaming data for storage in a first data store having an eventually consistent storage model, a data stream comprising a shard having a plurality of data records;
   determining a start offset and an end offset for one or more data records in the plurality of data records associated with the shard of the data stream;
   generating a storage key for the one or more data records using the start offset and an identifier associated with one of the plurality of archiving consumers processing the data record for storage;
   generating metadata for the one or more data records using at least the end offset as a reference to a start offset associated with other data records in the plurality of data records;
   storing the data record and the metadata as an object in the first data store using the storage key; and
   storing, in a second data store having an immediate consistency model, a manifest for the one or more data records using the start offset, the end offset, and the identifier associated with one of the plurality of archiving consumers to create a consistent view of an archive of the data stream stored in the first data store.

2. The method of claim 1 further comprising:
   retrieving the object from the first data store using the storage key;
   retrieving an additional object from the first data store using an additional key generated using the metadata; and
   wherein the additional object is retrieved from the first data store using the additional key generated using the metadata to verify completeness of the archive of the data stream stored in the first data store.

3. The method of claim 1 further comprising:
   determining a partitioning of the plurality of data records based on the shard associated with the data stream; and
   capturing information about the shard in the metadata to enforce completeness and serializability of the data stream in the archive of the data stream stored in the first data store.

4. The method of claim 1 further comprising:
   determining, based on the metadata, a directed acyclic graph representing a set of relationships between the plurality of data records; and
   traversing the directed acyclic graph to verify completeness of the archive of the data stream stored in the first data store.

5. A method, comprising:
   receiving, at data stream consumer, a data stream having at least one shard, wherein the shard includes a plurality of data records;
   identifying a first set of data records in the plurality of data records;
   generating, by the data stream consumer, metadata for the first set of data records that includes a first reference indicative of where the first set of data records ends relative to the shard in the data stream and where a second set of data records in the plurality of data records begins relative to the shard in the data stream;

storing the metadata and a first set of data records as one or more data chunks in the data store to enforce completeness and serializability of an archive of the data stream using the first reference to link to the second set of data records; and sending, to an additional data store, a manifest for the first set of data records derived from the metadata to generate, in the additional data store, a consistent view of the archive of the data stream stored in the data store.

6. The method of claim 5 further comprising:
determining the first reference as an end offset of a data record in the first set of data records.

7. The method of claim 5 further comprising:
retrieving the metadata from the data store;
retrieving metadata associated with the second set of data records using the first reference; and
retrieving, from the data store, the second set of data records using the metadata to validate completeness of the archive of the data stream.

8. The method of claim 5 further comprising:
generating the metadata with an offset keyword providing a reference indicating that a data chunk associated with the metadata represents the start or end of a partition.

9. The method of claim 5 further comprising:
receiving a storage confirmation from the data store for the first set of data records.

10. The method of claim 5 further comprising:
determining a relationship between the shard and an additional shard in the data stream;
generating the metadata to include identifiers indicating the determined relationship between the shard and the additional shard.

11. The method of claim 5 further comprising:
generating the metadata using a portion of a hash ring associated with the data stream that maps to the first set of data records; and
retrieving the second set of data records having metadata that includes another portion of the hash ring that maps to the second set of data records to validate completeness of the archive of the data stream.

12. The method of claim 5 further comprising:
generating a first storage key for the first set of data records using the first reference; and
storing the first set of data records as a data chunk in the data store using the first storage key.

13. The method of claim 12 further comprising:
determining a second storage key for a second data chunk based on constructing the second storage key using a second reference in the metadata indicative of where the first set of data records starts relative to the shard in the data stream and where a third set of data records in the plurality of data records ends relative to the shard in the data stream; and
retrieving the second data chunk from the data store using the second storage key to validate completeness of the archive of the data stream.

14. A system, comprising:
a processor; and
a memory storing instruction which when executed by the processor cause the processor to:
prepare a data chunk from a data stream comprising a plurality of data records for storage in a first data store having an eventually consistent consistency model;

capture metadata comprising a reference to a shard that includes one or more of the plurality of data records, a first location in the data stream where the one or more data records begin, and a second location in the data stream where the one or more data records end;

cause the data chunk to be stored in the first data store with the data chunk including the metadata to enforce completeness and serializability of an archive of the data stream stored in the first data store using the metadata to link to other data chunks associated with the archive of the data stream; and sending, to a second data store having an immediately consistent consistency model, a manifest for the data chunk using a portion of the captured metadata to create a view in the second data store of the archive of the data stream stored in the first data store.

15. The system of claim 14 wherein the instructions further cause the processor to:
identify the reference to the shard as a shard identifier;
determine the first location in the data stream where the plurality of data records have a start offset within the shard;
determine the second location in the data stream where the plurality of data records ends as an end offset within the shard; and
generating the metadata using the shard identifier, the start offset within the shard, and the end offset within the shard.

16. The system of claim 14 wherein the instructions further cause the processor to:
retrieve the data chunk from the first data store;
constructing, from the metadata in the data chunk, a reference to an additional data chunk using the reference to the shard and the second location in the data stream where the plurality of data records end; and
retrieve the additional data chunk from the first data store using the reference to validate completeness of the archive of the data stream stored in the first data store.

17. The system of claim 14 wherein the instructions further cause the processor to:
receive a storage confirmation from the first data store; and
generate the manifest to use in determining whether a conflict exists between data chunks in the first data store; and
cause the manifest to be sent to the second data store to determine the existence of another manifest for the data chunk in the second data store.

18. The system of claim 14 wherein the instructions further cause the processor to:
determine an identifier indicating a parent-child relationship between a first shard that includes the plurality of data records and a second shard;
generate the metadata to include the identifier indicating the relationship between the first shard and the second shard.

19. The system of claim 14 wherein the instructions further cause the processor to:
generate the metadata using a portion of a hash ring associated with the data stream that maps to one or more of the plurality of data records; and
retrieve one or more other data chunks that includes metadata having other portions of the hash ring to validate completeness of the archive of the data stream stored in the first data store.

20. The system of claim 14 wherein the instructions further cause the processor to:

generate a first storage key for the data chunk using the reference to the shard and a first location in the data stream where the plurality of data records begins; and store the data chunk in the first data store using the first storage key.

21. The system of claim 14 wherein the instructions further cause the processor to:

determine a second storage key for a second data chunk based on constructing the second storage key using the reference to the shard and the first location in the data stream where the plurality of data records begins; and retrieve the second data chunk from the first data store using the second storage key to validate completeness of the archive of the data stream stored in the first data store.

\* \* \* \* \*